(12) United States Patent
Chai et al.

(10) Patent No.: US 10,303,408 B2
(45) Date of Patent: May 28, 2019

(54) PRINTING VIA PRINTING DEVICE-INDEPENDENT INSTRUCTIONS

(71) Applicant: Hewlett-Packard Development Company, L.P., Houston, TX (US)

(72) Inventors: Xiaorong Chai, Shanghai (CN); Feng-Chen Yang, Shanghai (CN); Lei Chen, Shanghai (CN)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/544,707

(22) PCT Filed: Apr. 30, 2015

(86) PCT No.: PCT/CN2015/077997
§ 371 (c)(1),
(2) Date: Jul. 19, 2017

(87) PCT Pub. No.: WO2016/172931
PCT Pub. Date: Nov. 3, 2016

(65) Prior Publication Data
US 2018/0011668 A1    Jan. 11, 2018

(51) Int. Cl.
*G06F 3/12* (2006.01)

(52) U.S. Cl.
CPC .......... *G06F 3/1247* (2013.01); *G06F 3/1206* (2013.01); *G06F 3/128* (2013.01);
(Continued)

(58) Field of Classification Search
CPC .................................................. G06F 3/1247
(Continued)

(56) References Cited

U.S. PATENT DOCUMENTS

| 6,865,354 B2 | 3/2005 | Jackelen et al. |
| 7,016,061 B1 * | 3/2006 | Hewitt ................. G06F 3/1213 |
| | | 358/1.13 |

(Continued)

FOREIGN PATENT DOCUMENTS

| CN | 103057266 A | 4/2013 |
| CN | 104238964 A | 12/2014 |
| JP | 2004287496 A | 10/2004 |

OTHER PUBLICATIONS

Microsoft, "How to Add Custom Paper Sizes in Publisher," (Research Paper), Apr. 8, 2014, 1 page, available at http://support.microsoft.com/kb/826357.

*Primary Examiner* — Jacky X Zheng
(74) *Attorney, Agent, or Firm* — HP Inc. Patent Department (57) ABSTRACT

The present disclosure provides a method for printing via printing device-independent instructions. A rendered print job is received from a printer driver. A value of an attribute of the rendered print job is obtained. Determination regarding whether the value of the attribute of the rendered print job corresponds to one of a plurality of values acceptable by a printing device for the attribute is made. In response to a determination that the value is acceptable, the rendered print job is sent directly to the printing device. In response to a determination that the value is not acceptable, the rendered print job is re-rendered with a value acceptable by the printing device for the attribute, and the re-rendered print job is sent to the printing device.

17 Claims, 4 Drawing Sheets

(52) U.S. Cl.
CPC .......... *G06F 3/1254* (2013.01); *G06F 3/1285* (2013.01); *G06F 3/1245* (2013.01)

(58) Field of Classification Search
USPC ....................................................... 358/1.15
See application file for complete search history.

(56) References Cited

U.S. PATENT DOCUMENTS

| | | |
|---|---|---|
| 7,502,137 B2 | 3/2009 | Morales et al. |
| 8,314,946 B2 | 11/2012 | Brown |
| 8,810,820 B2 | 8/2014 | Withington et al. |
| 2005/0286063 A1* | 12/2005 | Owen .................... G06F 3/1205 358/1.13 |
| 2007/0195336 A1* | 8/2007 | Uotani .................. G06F 3/1204 358/1.1 |
| 2007/0279648 A1 | 12/2007 | Quach et al. |
| 2015/0169271 A1* | 6/2015 | Kikuchi .............. G06F 3/04842 358/1.2 |

\* cited by examiner

PRINTING VIA PRINTING DEVICE-INDEPENDENT INSTRUCTIONS

BACKGROUND

During an example printing process, content on a computing device is provided to a printer driver which may convert the job to a format (e.g. a page description language (PDL) file) printable by a printing device which is a machine for printing text or pictures onto medium, especially one linked to a computer. The PDL file containing both actual printer data and job attributes may then be sent to the printing device.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

As a customer's new specific requirements on printing arise, manufacturers of printing devices may modify their existing systems either printing device firmware or printer driver to meet customer's new needs. For example, each printing device has the ability to set paper size in the tray such as A3, B4, A4, B5, A5 and etc. Custom media size setting is also provided for printing some non-standard paper size jobs. But sometimes a customer cannot set their desired media size on a given printing device due to a minimal custom media size limitation of the printing device. In the following detailed description of examples of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Figure 1:
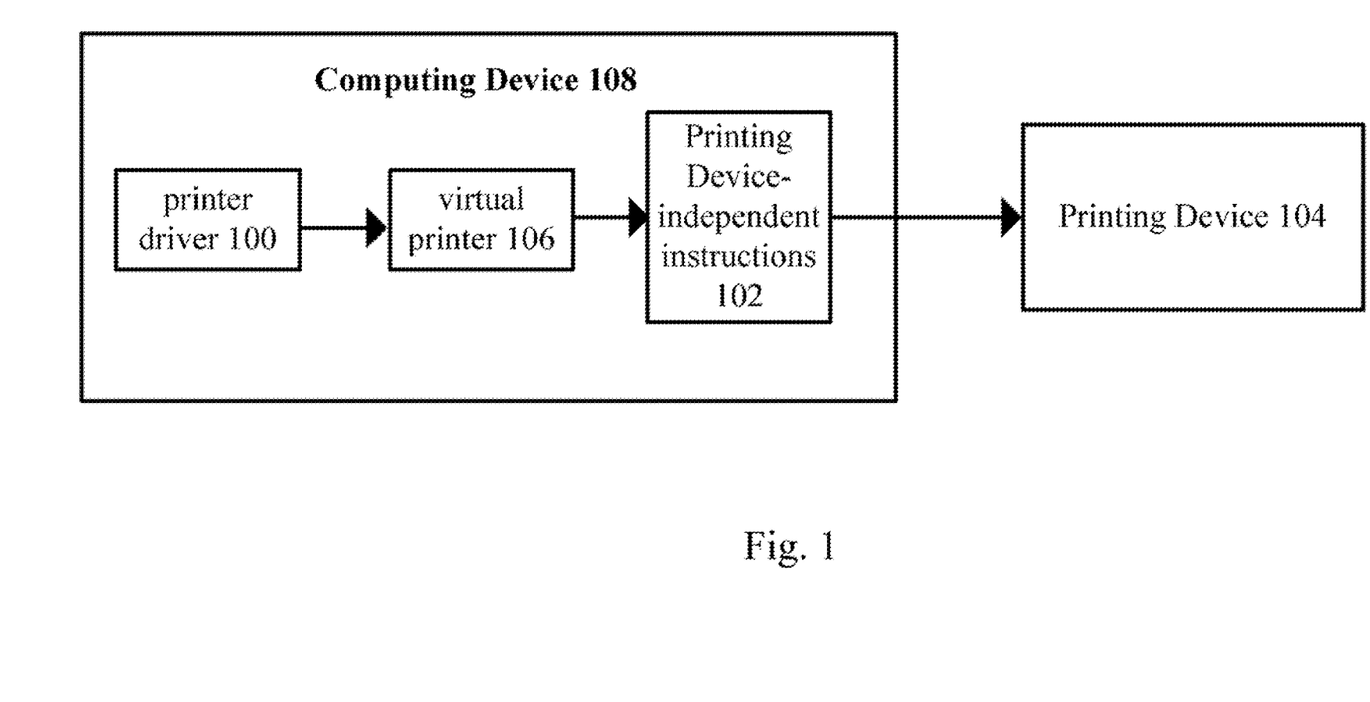
FIG. 1 illustrates a schematic diagram of a printing process in accordance with various examples of the disclosure.

Referring now to FIG. 1, a schematic diagram of printing process in accordance with various examples of the disclosure is described.

As shown in FIG. 1, printing device-independent instructions 102, which are e.g. machine readable instructions executable by at least one processor, functionally between a printer driver 100 installed on a computing device 108 (such as a notebook, a laptop computer, a handheld computer, a server, a workstation computer, a camcorder, a digital camera, a mobile phone, a smart phone, etc.) and a printing device 104 to receive a rendered print job from the printer driver 100, and determine whether a value of an attribute of the rendered print job corresponds to one of a plurality of values acceptable by the printing device for the attribute such that the printing device is able to print the print job. In response to a determination that the value is acceptable such that the printing device is able to print the print job, the printing device-independent instructions 102 will send the rendered print job directly to the printing device. In response to a determination that the value is not acceptable such that the printing device is not able to print the print job, the printing device-independent instructions 102 will re-render the rendered print job with a value acceptable by the printing device for the attribute such that the printing device is able to print the print job, and send the re-rendered print job to the printing device 104. Alternatively, a virtual printing device 106, that may be created automatically on a computing device when installing the printing device-independent instructions on the computing device, may receive a print job from the printer driver 100 and provide the print job to the printing device-independent instructions 102. The printing device-independent instructions 102 will monitor the user's print job and if an out of limitation job been found, it will automatically re-render the print job and send it to the printing device without user interaction.

In an example, assuming that a printing device supports a group of custom media sizes (A3, B4, A4, B5, A5), when a bank user needs to print checks for which the check media size is usually smaller than the minimal custom media size A5 of the printing device, a print job is sent to the printer driver 100 which converts the job to PDL file such as Page Description Language Level 6 (PCLXL), PostScript (PS) and etc. The PDL file containing both actual printer data and job attributes is then sent to the virtual printing device 106 which in turn provides the PDL file to the printing device-independent instructions 102. The printing device-independent instructions 102 determine from the PDL file whether a media size attribute of the print job is less than a minimum size A5 accepted by the printing device. In response to a determination that the media size attribute is less than A5, the printing device-independent instructions 102 will re-render the print job with a new media size (e.g. any of A3, B4, A4, B5, A5) accepted by the printing device, without scaling or otherwise changing the content of the job (for example, if the print job has e.g. images or text to be printed, the size of the images or text will not changed when a new media size is selected for the print job), and provides the re-rendered print job to the printing device 104.

In another example, as for a print job with a media size that does not match any of the custom media sizes A3, B4, A4, B5, A5 supported by the printing device 104 and is less than the maximum custom media size A3 supported by the printing device 104, the printing device-independent instructions 102 may re-render the print job with a new media size accepted by the printing device, without scaling or otherwise changing the content of the job. For example, when an unsupported media size of the job is smaller than A3 and larger than B4, A3 rather than B4 should be selected as the new media size, since it may be impossible for the content such as images or text of the job with the unsupported media size to be printed on media with size B4 entirely without scaling down accordingly.

In another example, as for a print job with a media size that does not match any of the custom media sizes supported by the printing device 104 and is greater than the maximum custom media size supported by the printing device 104, the printing device-independent instructions 102 may re-render the print job with a new media size accepted by the printing device, with scaling down the content of the print job, this is because the content such as images or text of the job with the unsupported media size greater than the supported maximum media size may be scaled down accordingly in order to suit for a new media size.

In another example, as for a print job with a media size that does not match any of the custom media sizes supported by the printing device 104, the printing device-independent instructions 102 may re-render the print job with a new media size accepted by the printing device which is closest the original media size of the print job among supported media sizes in order to satisfy the requirement of the user on the print job as far as possible.

For example, in examples described herein, to re-render a print job, instructions 102 may read the print job for its corresponding media size and may modify attributes of the print job, such as the media size and/or the offset of the print content, while keeping the print content in print job unchanged. In such examples, instructions 102 may determine a modified media size that is acceptable to the printing device (i.e., a media size that the printing device is able to print). In such examples, instructions 102 may create a new print job having the modified attributes such as the media size that is acceptable to the printing device (and modified offset, in some examples), and having the unchanged content for printing from the original print job. In such examples, instructions 102 may treat the new print job as the re-rendered print job. In some examples, the print job may be a PDL file. In such examples, instructions 102 may read the PDL file for its media size and may modify attributes of the PDL file, such as the media size and/or the offset of the print content, while keeping the print content in PDL file unchanged. In such examples, instructions 102 may determine a modified media size that is acceptable to the printing device (i.e., a media size that the printing device is able to print). In such examples, instructions 102 may create a new PDL file having the modified media size that is acceptable to the printing device (and modified offset, in some examples), and having the unchanged content for printing from the original PDL file. In such examples, instructions 102 may treat the new PDL file as the re-rendered print job. In other examples, the print job may have another format, and may be performed in a similar manner. In examples described herein, any re-rendering of a print job may be performed according to the above examples.

Although the above examples take media size as an attribute of a print job, the above printing process is also applicable to attributes such as print quality, print font and print tone, etc.

Figure 2:
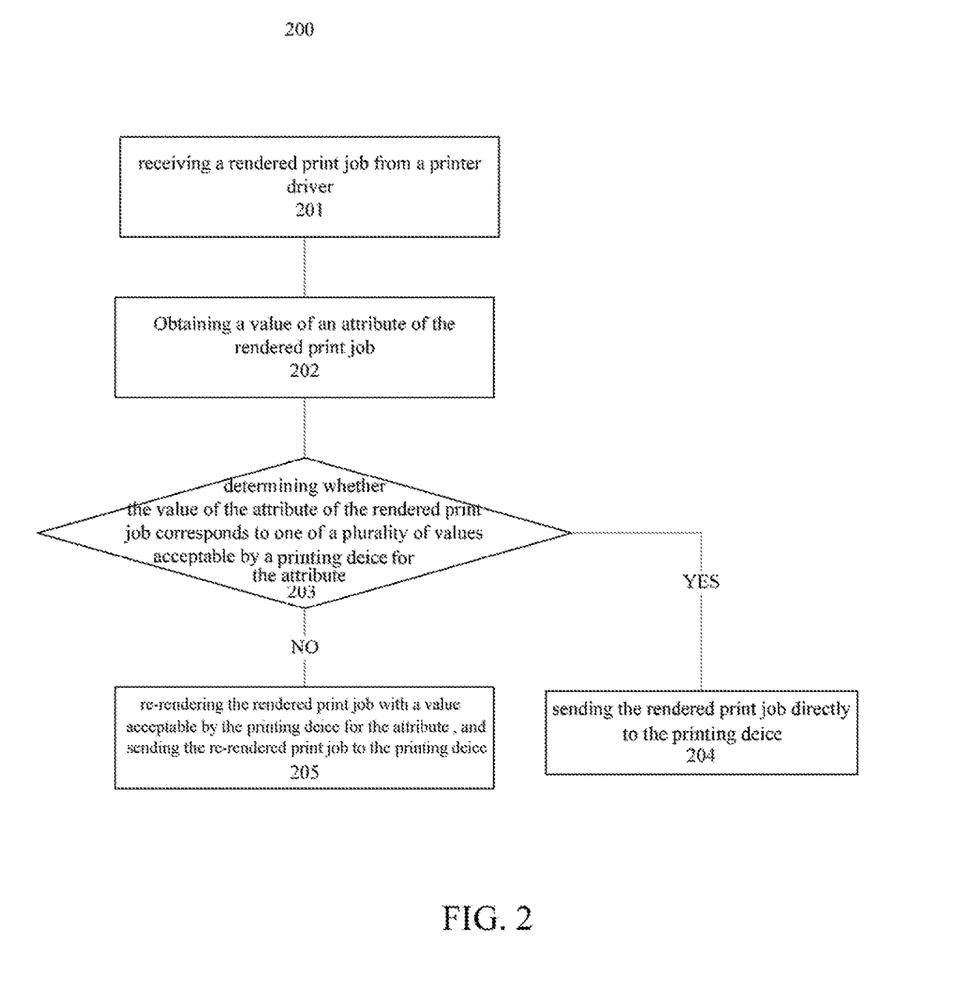
FIG. 2 illustrates an example method for printing via printing device-independent instructions in accordance with various examples of the disclosure.

Referring now to FIG. 2, an example method 200 for printing via printing device-independent instructions in accordance with various examples of the disclosure is described. For example, the method 200 may be performed by the printing device-independent instructions 102 described above in relation to FIG. 1. At block 201, a rendered print job is received from a printer driver. In an example, the rendered print job may be in the form of a PDL file such as Page Description Language Level 6 (PCLXL), PostScript (PS) and etc, which contains both actual printer data and job attributes such as media size, print quality, print font and print tone, etc. At block 202, a value of an attribute of the rendered print job is obtained through e.g. analyzing the rendered print job. At block 203, determination regarding whether the value of the attribute of the rendered print job corresponds to one of a plurality of values acceptable by a printing device for the attribute is made through e.g. comparing a value of an attribute of the rendered print job with values acceptable by a printing device for the attribute. In response to a determination that the value is acceptable, at block 204, the rendered print job is sent directly to the printing device. In response to a determination that the value is not acceptable, at block 205, the rendered print job is re-rendered with a value acceptable by the printing device for the attribute, and then the re-rendered print job is sent to the printing device.

In an example, the method further comprising: when a value of the media size of the rendered print job does not correspond to any of values acceptable by the printing device for the media size, determination regarding whether the value of the media size of the rendered print job is less than a maximum value acceptable by the printing device is made; in response to a determination that the value is less than the maximum value, the rendered print job is re-rendered with a new media size acceptable by the printing device, without scaling or otherwise changing the content of the print job; and in response to a determination that the value is greater than the maximum value, the rendered print job is re-rendered with a new media size acceptable by the printing device with scaling down the content of the print job.

In another example, at block 205, the rendered print job is re-rendered with a value acceptable by the printing device for the attribute which is nearest to the value of the attribute of the rendered print job among the plurality of values acceptable by the printing device for the attribute in order to satisfy the requirement of the user on the print job as far as possible.

In another example, the printing device is a laser printer or an inkjet printer.

Figure 3:
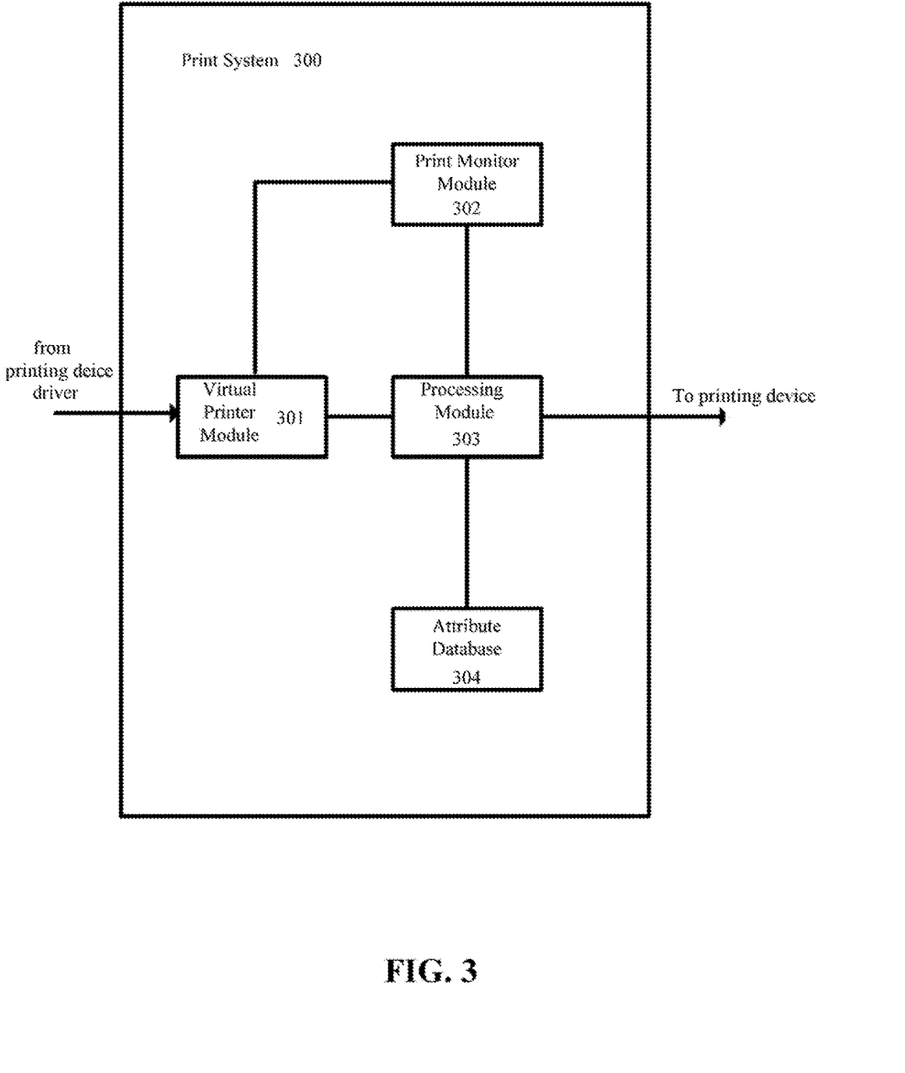
FIG. 3 illustrates an example printing system in accordance with various examples of the disclosure.

Referring now to FIG. 3, an example printing system 300 in accordance with various examples of the disclosure is described. The printing system 300 may include a virtual printing device module 301, a print monitor module 302, a processing module 303 and an attribute database 304. Each of modules 301-304 of system 300 may be any combination of hardware and programming to implement the functionalities of the respective engine. In examples described herein, such combinations of hardware and programming may be implemented in a number of different ways. For example, the programming for the modules may be processor executable instructions stored on a non-transitory machine-readable storage medium and the hardware for the modules may include a processing resource to execute those instructions. In such examples, the machine-readable storage medium may store instructions that, when executed by the processing resource, implement modules 301-304. In such examples, system 300 may include the machine-readable storage medium storing the instructions and the processing resource to execute the instructions, or the machine-readable storage medium may be separate but accessible to system 300 and the processing resource. In other examples, the functionalities of any modules of system 300 may be implemented in the form of electronic circuitry.

The virtual printing device module 301 receives a rendered print job from a printer driver, for example, the rendered print job may be in the form of a PDL file such as Page Description Language Level 6 (PCLXL), PostScript (PS) and etc, which contains both actual printer data and job attributes such as media size, print quality, print font and print tone, etc.

The print monitor module 302 detects when the virtual printing device module 301 receives a rendered print job, and in response, it instructs the processing module 303 to process the rendered print job by e.g. sending a signal or an instruction to the processing module 303.

The processing module 303, as instructed by the print monitor module 302, analyzes the rendered print job to obtain a value of an attribute of the rendered print job and compares the value of the attribute of the rendered print job with values acceptable by a printing device for the attribute stored by the attribute database 304; wherein when the value of the attribute of the rendered print job does not match any of values acceptable by the printing device for the attribute, it re-renders the rendered print job with a value acceptable by the printing device for the attribute, and sends the re-rendered print job to the printing device; and when the value of the attribute of the rendered print job matches one of a plurality of values acceptable by the printing device for the attribute, it sends the rendered print job directly to the printing device. In an example, when the value of the attribute of the rendered print job does not match any of values acceptable by the printing device for the attribute, the processing module 304 re-renders the rendered print job with a value acceptable by the printing device for the attribute which is nearest to the value of the attribute of the rendered print job among the plurality of values acceptable by the printing device for the attribute in order to satisfy the requirement of the user on the print job as far as possible. In another example, when a value of the media size of the rendered print job does not match any of values acceptable by the printing device for the media size, the processing module 304 further determines whether the value of the media size of the rendered print job is less than a maximum value acceptable by the printing device; in response to a determination that the value is less than the maximum value, re-render the rendered print job with a new media size acceptable by the printing device, without scaling or otherwise changing the content of the print job; and in response to a determination that the value is greater than the maximum value, re-render the rendered print job with a new media size acceptable by the printing device with scaling down the content of the print job.

Figure 4:
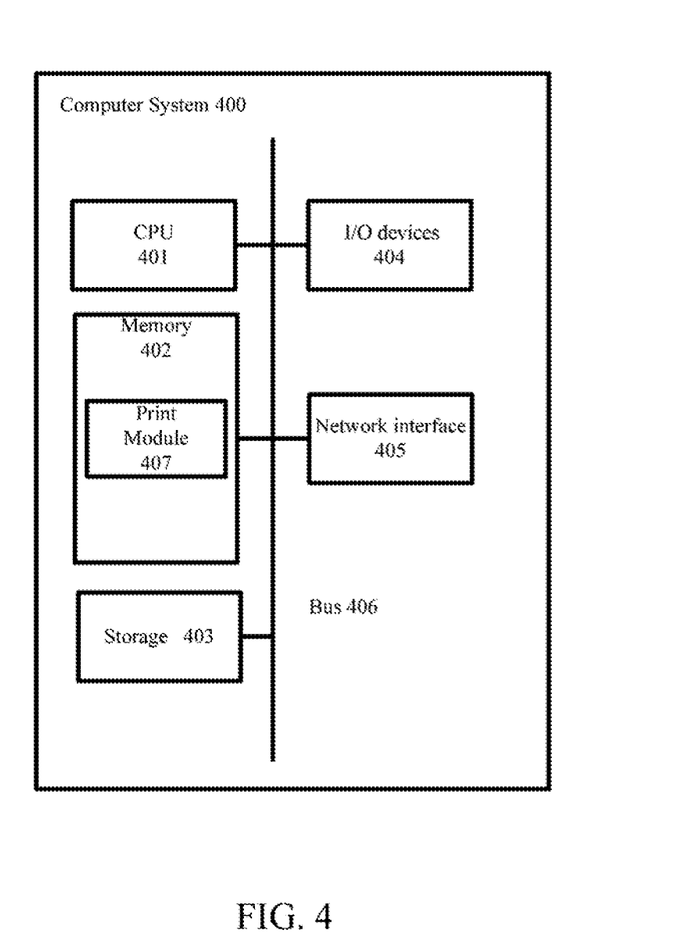
FIG. 4 illustrates a diagram of a computer system for implementing various examples of the disclosure.

Referring now to FIG. 4, a diagram of a computer system 400 for implementing various examples of the disclosure is described. Examples of the disclosure may be implemented on virtually any type of computer regardless of the platform being used. For example, as shown in FIG. 4, the computer system 400 includes a processor(s) CPU 401, an associated memory 402 (e.g., random access memory (RAM), cache memory, flash memory, etc.), a storage device 403 (e.g., a hard disk, an optical drive such as a compact disk drive or digital video disk (DVD) drive, a flash memory stick, etc.), I/O devices 404 such as a keyboard, a mouse, a microphone (not shown) or a monitor and a network interface 405, which couple with each other with a bus 406.

The memory 402 includes, among others, a print module 407 storing machine readable instructions such as the printing device-independent instructions 102 shown in FIG. 1 which, when executed by the processor 401, cause the processor to perform the operations described above in relation to printing device-independent instructions 102 of FIG. 1. The memory 402 may include non-transitory machine-readable storage media. In some example, the operations include performing the method as explained with respect to FIG. 2. In another example, the print system 300 as shown in FIG. 3 may be implemented as the print module 407. Another example of the print module 407 includes instructions that cause the processor(s) 401 to realize the print system 300 in FIG. 3 and the method 200 illustrated in FIG. 2.

Thanks to the printing solution described above, in order to meet customers' new specific requirements on printing, it is only required for customers to install an additional software package without modifying the existing system either printing device firmware or printer driver. Therefore, the printing solution disclosed in the disclosure will not impact the existing system and will add no additional cost. It would make things easy for both of manufacturers and customers.

While the disclosure has been described with respect to a limited number of examples, those skilled in the art, having benefit of this disclosure, will appreciate that other example embodiments can be devised which do not depart from the scope of the disclosure as disclosed herein. Accordingly, the scope of the disclosure should be limited only by the attached claims.

The invention claimed is:

1. A method for printing via printing device-independent instructions, comprising:
   receiving a rendered print job from a printer driver;
   obtaining a value of an attribute of the rendered print job;
   determining whether the value of the attribute of the rendered print job corresponds to one of a plurality of values acceptable by a printing device for the attribute such that the printing device is able to print the print job;
   in response to a determination that the value is not acceptable such that the printing device is not able to print the rendered print job, re-rendering the rendered print job with a value acceptable by the printing device for the attribute such that the printing device is able to print the re-rendered print job, and sending the re-rendered print job to the printing device.

2. The method according to claim 1, wherein the method further comprising: in response to a determination that the value is acceptable such that the printing device is able to print the print job, sending the rendered print job directly to the printing device.

3. The method according to claim 1, wherein the attribute is selected from a group comprising media size, print quality, print font and print tone.

4. The method according to claim 3, wherein the method further comprising:
   when a value of the media size of the rendered print job does not correspond to any of values acceptable by the printing device for the media size such that the printing device is not able to print the print job, determining whether the value of the media size of the rendered print job is less than a maximum value acceptable by the printing device such that the printing device is able to print the print job,
   in response to a determination that the value is less than the maximum value, re-rendering the rendered print job with a new value of the media size acceptable by the printing device such that the printing device is able to print the print job, without scaling the content of the print job; and
   in response to a determination that the value is greater than the maximum value, re-rendering the rendered print job with a new value of the media size acceptable by the printing device such that the printing device is able to print the print job with scaling down the content of the print job.

5. The method according to claim 1, wherein re-rendering the rendered print job with a value acceptable by the printing device for the attribute such that the printing device is able to print the print job comprises:
   re-rendering the rendered print job with a value acceptable by the printing device such that the printing device is able to print the print job for the attribute which is nearest to the value of the attribute of the rendered print job among the plurality of values acceptable by the printing device for the attribute such that the printing device is able to print the print job.

6. The method according to claim 1, wherein the printing device is a laser printer or an inkjet printer.

7. The method of claim 1, wherein the printing device prints the re-rendered print job.

8. The method of claim 1, further comprising:
printing, by the printing device, the re-rendered print job as has been sent to the printing device.

9. A printing system, comprising:
a storage device storing an attribute database of values acceptable by a printing device for different attributes such that the printing device is able to print a print job;
a processor; and
a non-transitory computer-readable data storage medium storing program code executable by the processor to:
receive a rendered print job from a printer driver,
detect when the virtual printing device module receives a rendered print job, and in response, to instruct a processing module to process the rendered print job;
analyze the rendered print job to obtain a value of an attribute of the rendered print job and compare the value of the attribute of the rendered print job with values acceptable by the printing device for the attribute such that the printing device is able to print the print job; wherein when the value of the attribute of the rendered print job does not match any of values acceptable by the printing device for the attribute such that the printing device is not able to print the rendered print job, the processor is to re-render the rendered print job with a value acceptable by the printing device for the attribute such that the printing device is able to print the print job, and send the re-rendered print job to the printing device; and when the value of the attribute of the rendered print job matches one of a plurality of values acceptable by the printing device for the attribute such that the printing device is able to print the print job, the processing module is to send the rendered print job directly to the printing device.

10. The printing system according to claim 9, wherein the attribute is selected from a group comprising media size, print quality, print font and print tone.

11. The printing system according to claim 9, wherein the program code is executable by the processor to further:
when a value of the media size of the rendered print job does not match any of values acceptable by the printing device for the media size such that the printing device is not able to print the print job, determine whether the value of the media size of the rendered print job is less than a maximum value acceptable by the printing device such that the printing device is able to print the print job,
in response to a determination that the value is less than the maximum value, re-render the rendered print job with a new value of the media size acceptable by the printing device such that the printing device is able to print the print job, without scaling the content of the print job; and
in response to a determination that the value is greater than the maximum value, re-render the rendered print job with a new value of the media size acceptable by the printing device such that the printing device is able to print the print job with scaling down the content of the print job.

12. The printing system according to claim 9, wherein the program code is executable by the processor to further:

when the value of the attribute of the rendered print job does not match any of values acceptable by the printing device for the attribute such that the printing device is not able to print the print job, re-render the rendered print job with a value acceptable by the printing device for the attribute which is nearest to the value of the attribute of the rendered print job among the plurality of values acceptable by the printing device for the attribute such that the printing device is able to print the print job.

13. The printing system according to claim 1, wherein the printing device is a laser printer or an inkjet printer.

14. An apparatus comprising:
a processor; and
a memory storing computer readable instructions executable by the processor to:
receive a rendered print job from a printer driver;
obtain a media size of the rendered print job;
determine whether the media size of the rendered print job matches one of a plurality of media sizes able to be printed by a printing device;
based on a determination that the media size is able to be printed by the printing device, send the rendered print job directly to the printing device; and
based at least in part on a determination that the media size is not able to be printed by the printing device, re-render the rendered print job with a new value for the media size able to be printed by the printing device, and send the re-rendered print job to the printing device.

15. The apparatus according to claim 14, wherein the memory further stores instructions which, when executed by the processor, cause the processor to: when the value of the media size of the rendered print job is less than a minimum value able to be printed by the printing device, re-render the rendered print job with a new value for the media size able to be printed by the printing device without scaling the content of the print job.

16. The apparatus according to claim 14, wherein the memory further stores instructions which, when executed by the processor, cause the processor to:
when the value of the media size of the rendered print job does not match any of values able to be printed by the printing device for the media size and the value of the media size of the rendered print job is less than a maximum value able to be printed by the printing device, re-render the rendered print job with a new value of the media size able to be printed by the printing device, without scaling the content of the print job; and
when the value of the media size of the rendered print job does not match any of values able to be printed by the printing device for the media size and the value of the media size of the rendered print job is greater than a maximum value able to be printed by the printing device, re-render the rendered print job with a new value of the media size able to be printed by the printing device with scaling down the content of the print job.

17. The apparatus according to claim 14, wherein the memory further stores instructions which, when executed by the processor, cause the processor to:
when the value of the media size of the rendered print job does not match any of values able to be printed by the printing device for the media size, re-render the rendered print job with a value able to be printed by the printing device for the media size which is nearest to the value of the media size of the rendered print job among the plurality of values able to be printed by a printing device for the media size.

\* \* \* \* \*

UNITED STATES PATENT AND TRADEMARK OFFICE
CERTIFICATE OF CORRECTION

PATENT NO. : 10,303,408 B2  
APPLICATION NO. : 15/544707  
DATED : May 28, 2019  
INVENTOR(S) : Xiaorong Chai et al.

Page 1 of 1

It is certified that error appears in the above-identified patent and that said Letters Patent is hereby corrected as shown below:

In the Drawings

In sheet 2 of 4, FIG. 2, reference numeral 203, Line 4, delete "deice" and insert -- device --, therefor.

In sheet 2 of 4, FIG. 2, reference numeral 205, Line 2, delete "deice for the attribute ," and insert -- device for the attribute, --, therefor.

In sheet 2 of 4, FIG. 2, reference numeral 205, Line 3, delete "deice" and insert -- device --, therefor.

In sheet 2 of 4, FIG. 2, reference numeral 204, Line 2, delete "deice" and insert -- device --, therefor.

In sheet 3 of 4, FIG. 3, Line 6, delete "deice" and insert -- device --, therefor.

Signed and Sealed this  
Twenty-sixth Day of November, 2019

Andrei Iancu  
*Director of the United States Patent and Trademark Office*